(12) United States Patent
Revink et al.

(10) Patent No.: US 9,592,730 B2
(45) Date of Patent: Mar. 14, 2017

(54) TANK VENTILATION DEVICE FOR A MOTOR VEHICLE

(75) Inventors: Ingo Revink, Ingolstadt (DE); Thomas Just, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/006,522

(22) PCT Filed: Mar. 16, 2012

(86) PCT No.: PCT/EP2012/001171
§ 371 (c)(1),
(2), (4) Date: Sep. 20, 2013

(87) PCT Pub. No.: WO2012/126593
PCT Pub. Date: Sep. 27, 2012

(65) Prior Publication Data
US 2014/0007963 A1   Jan. 9, 2014

(30) Foreign Application Priority Data
Mar. 23, 2011   (DE) .......................... 10 2011 014 713

(51) Int. Cl.
*F16K 24/00*   (2006.01)
*B60K 15/035*  (2006.01)
(Continued)

(52) U.S. Cl.
CPC ............... *B60K 15/03519* (2013.01); *B60K 2015/03289* (2013.01); *B60K 2015/03509* (2013.01);
(Continued)

(58) Field of Classification Search
CPC ......... Y10T 137/4841; Y10T 137/4857; Y10T 137/86324; Y10T 137/86332; B60K 15/04;
(Continued)

(56) References Cited

U.S. PATENT DOCUMENTS 3,617,034 A * 11/1971 Skinner .......................... 123/518
3,757,753 A    9/1973 Hunt
(Continued)

FOREIGN PATENT DOCUMENTS

CN   101378930   3/2009
CN   101622491   1/2010
(Continued)

OTHER PUBLICATIONS

International Search Report issued by the European Patent Office in International Application PCT/EP2012/001171 on Oct. 10, 2012.
(Continued)

*Primary Examiner* — Craig J Price
(74) *Attorney, Agent, or Firm* — Henry M. Feiereisen LLC

(57) ABSTRACT

A tank ventilation device for a motor vehicle includes a ventilation line, connected on one side to an accumulator for gaseous hydrocarbons and connected on another side via a connection to a filling tube for filling a tank of the motor vehicle, wherein the ventilation line is connected to the tank so that gaseous hydrocarbons which are displaced during refueling are re-circulated toward the connection via the ventilation line, a device for applying a pressure on the ventilation line for carrying out a leakage test of the tank ventilation device, when the filling tube is closed with a closure device, and a float body provided in a region of the connection of the ventilation line to the filing tube for preventing entering of liquid fuel into the ventilation line.

5 Claims, 1 Drawing Sheet

(51) Int. Cl.
*B60K 15/03* (2006.01)
*B60K 15/04* (2006.01)

(52) U.S. Cl.
CPC .............. *B60K 2015/03514* (2013.01); *B60K 2015/03576* (2013.01); *B60K 2015/0458* (2013.01); *B60K 2015/0493* (2013.01); *Y10T 137/86332* (2015.04)

(58) Field of Classification Search
CPC .... B60K 15/03519; B60K 2015/03289; B60K 2015/03509; B60K 2015/03576; B65D 90/32; F02M 25/0872; F02M 25/0818
USPC ................. 137/265, 266, 587, 588, 43, 202; 73/114.38, 114.39
See application file for complete search history.

(56) References Cited

U.S. PATENT DOCUMENTS

| | | | |
|---|---|---|---|
| 4,331,120 A * | 5/1982 | Hiramatu et al. ............ 123/520 |
| 4,630,749 A * | 12/1986 | Armstrong ............... B67D 7/54 |
| | | | 141/59 |
| 4,706,708 A * | 11/1987 | Fornuto et al. ............... 137/588 |
| 4,714,172 A * | 12/1987 | Morris ............. B60K 15/03519 |
| | | | 137/351 |
| 4,747,508 A * | 5/1988 | Sherwood ........ B60K 15/03519 |
| | | | 141/326 |
| 4,798,306 A | 1/1989 | Giacomazzi et al. |
| 4,809,863 A * | 3/1989 | Woodcock et al. ........... 220/746 |
| 4,816,045 A * | 3/1989 | Szlaga et al. .................. 220/746 |
| 4,887,578 A * | 12/1989 | Woodcock et al. ........... 123/519 |
| 4,932,444 A | 6/1990 | Micek |
| 5,027,868 A | 7/1991 | Morris et al. |
| 5,103,877 A | 4/1992 | Sherwood et al. |
| 5,146,902 A * | 9/1992 | Cook et al. .................... 123/518 |
| 5,183,087 A | 2/1993 | Aubel et al. |
| 5,267,470 A * | 12/1993 | Cook ........................ 73/114.39 |
| 5,329,164 A * | 7/1994 | Saito ...................... 123/198 DC |
| 5,538,039 A | 7/1996 | Harde et al. |
| 5,579,742 A * | 12/1996 | Yamazaki et al. ............ 123/520 |
| 5,606,121 A * | 2/1997 | Blomquist et al. ........ 73/114.39 |
| 5,606,954 A * | 3/1997 | Yamazaki et al. ............ 123/520 |
| 5,635,630 A * | 6/1997 | Dawson et al. ........... 73/114.39 |
| 5,647,334 A * | 7/1997 | Miller ........................... 123/520 |
| 5,657,734 A * | 8/1997 | Sawamoto et al. ........... 123/519 |
| 5,669,361 A * | 9/1997 | Weissinger et al. .......... 123/520 |
| 6,059,543 A | 5/2000 | Schulz |
| 6,269,832 B1 * | 8/2001 | Besnard et al. ............... 137/587 |
| 6,328,022 B1 * | 12/2001 | Kolb ............................. 123/520 |
| 6,367,458 B1 * | 4/2002 | Furusho et al. ............... 123/519 |
| 6,397,824 B1 * | 6/2002 | Takatsuka et al. ............ 123/520 |
| 6,604,407 B2 * | 8/2003 | Kano et al. ................. 73/114.38 |
| 8,360,091 B2 * | 1/2013 | Revink .......................... 137/587 |
| 8,616,047 B2 * | 12/2013 | Grunwald et al. ............ 123/516 |
| 8,869,777 B2 * | 10/2014 | Espinoza ...................... 123/520 |
| 8,910,675 B2 * | 12/2014 | Coulon et al. ................ 141/198 |
| 2002/0026826 A1 * | 3/2002 | Cook et al. ................... 73/118.1 |
| 2003/0140970 A1 | 7/2003 | Benjey |
| 2003/0226549 A1 * | 12/2003 | Takagi et al. ................. 123/520 |
| 2004/0129066 A1 * | 7/2004 | Schulz et al. ................ 73/118.1 |
| 2004/0144443 A1 * | 7/2004 | Ganachaud ..................... 141/59 |
| 2004/0206392 A1 * | 10/2004 | Fruhling .............. B60K 15/035 |
| | | | 137/43 |
| 2005/0155670 A1 | 7/2005 | Aschoff et al. |
| 2005/0279406 A1 | 12/2005 | Atwood et al. |
| 2006/0150722 A1 * | 7/2006 | Kato et al. ................... 73/118.1 |
| 2010/0147863 A1 | 6/2010 | Grun et al. |
| 2014/0318504 A1 * | 10/2014 | Pearce et al. ................. 123/518 |

FOREIGN PATENT DOCUMENTS

| | | |
|---|---|---|
| DE | 44 20 960 A1 | 12/1995 |
| DE | 102 38 234 A1 | 3/2004 |
| DE | 10 2005 028 952 A1 | 3/2006 |
| DE | 102005011026 | 9/2006 |
| DE | 10 2005 052 072 B3 | 7/2007 |
| DE | 10 2006 049 344 | 4/2008 |
| DE | 10 2007 036 112 A1 | 2/2009 |
| DE | 10 2008 061 264 A1 | 6/2010 |
| EP | 1 955 888 A2 | 8/2008 |
| GB | 233675 | 10/1925 |
| JP | 1-188779 | 7/1989 |
| WO | WO 95/10701 | 4/1995 |

OTHER PUBLICATIONS

Chinese Search Report issued on May 22, 2015 in counterpart Chinese Patent Application No. 2012800141009.
English translation of Chinese Search Report issued on May 22, 2015 in counterpart Chinese Patent Application No. 2012800141009.
Translation of Chinese Search Report issued on Jan. 4, 2016 with respect to counterpart Chinese patent application 201280014100.9.
Chinese Office Action (first page only) and Search Report issued on Sep. 18, 2016 with respect to counterpart Chinese patent application 201280014100.9.
English ranslation of Chinese Office Action (first page only) and Search Report issued on Sep. 18, 2016 with respect to counterpart Chinese patent application 201280014100.9.
Chinese Office Action (first page only) and Search Report issued on Jun. 13, 2016 with respect to counterpart Chinese patent application 201280014100.9.
English translation of Chinese Office Action (first page only) and Search Report issued on Jun. 13, 2016 with respect to counterpart Chinese patent application 201280014100.9.

* cited by examiner

TANK VENTILATION DEVICE FOR A MOTOR VEHICLE

CROSS-REFERENCES TO RELATED APPLICATIONS

This application is the U.S. National Stage of International Application No. PCT/EP2012/001171, filed Mar. 16, 2012, which designated the United States and has been published as International Publication No. WO 2012/126593 and which claims the priority of German Patent Application, Serial No. 10 2011 014 713.6, filed Mar. 23, 2011, pursuant to 35 U.S.C. 119(a)-(d).

BACKGROUND OF THE INVENTION

The invention relates to a tank ventilation device for a motor vehicle in which a tank can be filled with fuel via a filling tube. One side of a ventilation device is connected to the filling tube and the other side to an accumulator for gaseous hydrocarbons.

DE 10 2008 061 A1 relates to a fuel container which can be filled via a filling tube. A ventilation device is connected to the filling tube close to a mouth of the filling tube. Via this ventilation device gaseous hydrocarbons which where displaced during the refueling out of the fuel container can be conducted to an activated carbon filter in which the gaseous hydrocarbons are accumulated. Inserting a nozzle into the mouth of the filling tube causes a pivoting of a flap which carries a cup-shaped closing body. The closing body then closes the inlet into the ventilation device so that no liquid fuel can enter from the filling tube into the ventilation device. However, fuel can still be conducted to the activated carbon filter via the ventilation device.

In a tank ventilation device disclosed in U.S. Pat. No. 5,103,877 A, a very complex valve is provided at a connector of the filling tube which leads to the activated carbon filter of the ventilation device. The valve is opened by inserting the nozzle into the mouth of the filling tube. It then allows gaseous hydrocarbons to pass, however, it prevents liquid fuel from entering the ventilation line.

In the embodiment according to U.S. Pat. No. 4,932,444 A and in the embodiment according to U.S. Pat. No. 4,747,508 A, a float ball prevents fuel from reaching the activated carbon filter from the filing tube via the ventilation line. According to U.S. Pat. No. 4,932,444 A an access on the side of the filling tube to the ventilation line is closed by means of a valve disc which is lifted as a result of removing a tank lid from the filling tube. Therefore, when the tank lid is closed, the ventilation line to the filling tube is blocked. When the tank lid is open and the filling level of the tank is high in the filling tube, the float ball closes the access to the ventilation line. According to U.S. Pat. No. 4,7474,508 A, the float ball is also pushed into a valve seat by means of a lever when the tank lid is closed, so that an access on the side of the filling tube to the ventilation line is closed.

Object of the present invention is to provide a tank ventilation device of the above-mentioned type in which the ventilation line has a further function, wherein liquid fuel is prevented from entering the ventilation line with simple measures.

SUMMARY OF THE INVENTION

This object is solved by a tank ventilation device including a ventilation line connected at one side via a connection to a filling tube for filling a tank of the motor vehicle and connected at another side to an accumulator for gaseous hydrocarbons, wherein the ventilation line is connected to the tank so that gaseous hydrocarbons which are displaced during refueling are re-circulated toward the connection via the ventilation line; a device for applying a pressure to the ventilation line for performing a leakage test of the tank ventilation device, when the filling tube is closed by a closure device, and a float body provided in a region of the connection of the ventilation line to the filing tube for preventing entering of liquid fuel into the ventilation line. Advantageous embodiments with useful refinements of the invention are set forth in the dependent patent claims.

In the tank ventilation device according to the invention, the ventilation line can be pressurized by means of a device for performing a leakage test of the tank ventilation device, when the filling tube is closed toward the outside by means of a tank lid or by means of such a closure device for closing the filling tube. Instead of the tank lid, at least one spring loaded flap can also be provided as such a closing device, which is pushed on by inserting the nozzle into the filling tube and then releases the filling tube. In addition a float body is provided in the region of a connection of the ventilation line to the filling tube by means of which float body liquid fuel can be prevented from entering the ventilation line.

The testing of the tank ventilation device for leakage serves to recognize the tightness of the tank ventilation device, which contains gaseous hydrocarbons. The ventilation line can be pressurized with overpressure by a pump or similar pressure-generating device included in the device for carrying out the leakage test. Under test conditions, a tank lid with a small through bore is screwed onto the filling tube. The sensitivity of the device for leakage testing has to be sufficient to detect the pressure decrease resulting from fuel vapors leaking from the through bore. As an alternative, when the tank is warm, the ventilation line can be blocked in the region of the accumulator so that when the content of the tank cools down a negative pressure is generated in the ventilation line. Also in this case, the filling tube is closed by the tank lid, which has the small through bore, in which case the decrease of the negative pressure has to be detected.

In the present described ventilation line, when the tank lid is closed, the leakage test allows recognizing whether an overpressure or negative pressure can be retained in the tank ventilation device and with this whether tightness exists. It can also be recognized during the leakage test whether the tank lid is absent or whether the tank lid does not properly close the filling tube. Thus, a further functionality of the ventilation line is given because the ventilation line can also be used during an on board diagnosis (OBD) to detect whether a leakage exists.

In addition, the float body which is provided in the region of the connection of the ventilation line to the filling tube prevents in a simple a reliable manner liquid fuel from entering the ventilation line from the filling tube. This is in particular useful when the nozzle is defective and does not shut down automatically as soon as a correspondingly high filling level is reached in the filling tube. In addition in case of a particularly dynamic driving, and in particular in extreme curve positions of the motor vehicle, liquid fuel, which is present in the filling tube, can reach the region of the connection of the ventilation line on the filing tube. Also in this case the float body, which floats on the liquid fuel prevents that liquid fuel enters the ventilation line. This also avoids that liquid fuel reaches the accumulator for fuel vapor, which can be in particular an activated carbon filter.

In an advantageous embodiment of the invention, a valve seat for the float body is formed by an outlet of the connection. This enables a particularly reliable closing of the outlet by the float body, which floats on the liquid fuel. When the float body is configured spherical it can be brought into contact with the valve seat particularly easily.

It has further been proven advantageous when in a chamber of the connection, which receives the float body, a retention element is arranged which prevents the float body from moving out of the chamber. This allows ensuring with a particularly simple construction that the float body does not reach the filling tube.

The retention element can be provided in the form of least one band which is spaced apart from walls of the chamber so that the float body does not fit between the band and a respective wall of the chamber. In addition or as an alternative a grid can be provided which securely retains the float body in the chamber and at the same time allows unimpeded flow through the chamber when gaseous hydrocarbons flow through the ventilation line.

It is further advantageous when the ventilation line is connected to the tank. This allows recirculation of gaseous hydrocarbons, which were displaced out of the tank, toward the connection of the ventilation line on the filling tube. As a result of such a recirculation or return of gaseous hydrocarbons, which exit from the ventilation line and are introduced into the filling tube, an especially low amount of gaseous hydrocarbons leaves the filling tube via the mouth of the filling tube during refueling. The recirculation flow of the gaseous hydrocarbons through the ventilation line pushes the float body away form the outlet of the connection so as to allow unimpeded flow through the ventilation line.

The ventilation line can be coupled with a liquid separator, which is arranged in the tank, and is fluidly connected with at least one operating ventilation device of the tank. This allows providing a particularly small number of connection sites, which can be potentially associated with leakages of the tank ventilation device. Via the operating ventilation device, gaseous fuel can be conducted toward the liquid separator when the tank contents heat up, from which liquid separator the gaseous fuel then reaches the accumulator for gaseous hydrocarbons via the ventilation line. The liquid separator serves for separating liquid fuel, which may have been carried along in the operating ventilation device. With this, the liquid separator prevents liquid fuel from reaching the accumulator for gaseous hydrocarbons.

Finally, it is advantageous when the ventilation line has a U-shaped region, which is configured to pass below at least one component of the motor vehicle. Such a U-shaped region or siphon facilitates mounting of the tank together with the ventilation line to the motor vehicle, which is usually performed from below. In motor vehicles, the siphon may only pass underneath in particular a beam, for example a cross member or a longitudinal member. Owing to the siphon the ventilation line does not have to be separated during mounting and reassembled again in the region of passage in the beam or above the beam.

When the ventilation line has such a siphon it is especially important for the functionality of the ventilation line to ensure that no liquid fuel reaches the ventilation line and with this the siphon. Usually the negative pressure in the tank resulting from cooling down is insufficient to transport the liquid fuel present in the siphon, which fuel represents a hydraulic closure, back to the tank. The float body, which is provided in the region of the connection of the ventilation line on the filling tube, however, ensures that also when the ventilation line has a siphon, flow can always take place through the ventilation line or it can be used for pneumatic leakage testing.

The above mentioned features and feature combinations and the features and feature combinations mentioned in the following description of the figures and/or features and feature combinations shown by themselves in the figures may not only be used in the respectively set forth combination but also in other combinations or by themselves without departing from the scope of the invention.

Further advantages features and details of the invention become apparent form the claims the following description of preferred embodiments and by way of the drawing. It is shown in:

DETAILED DESCRIPTION OF PREFERRED EMBODIMENTS

Figure 1:
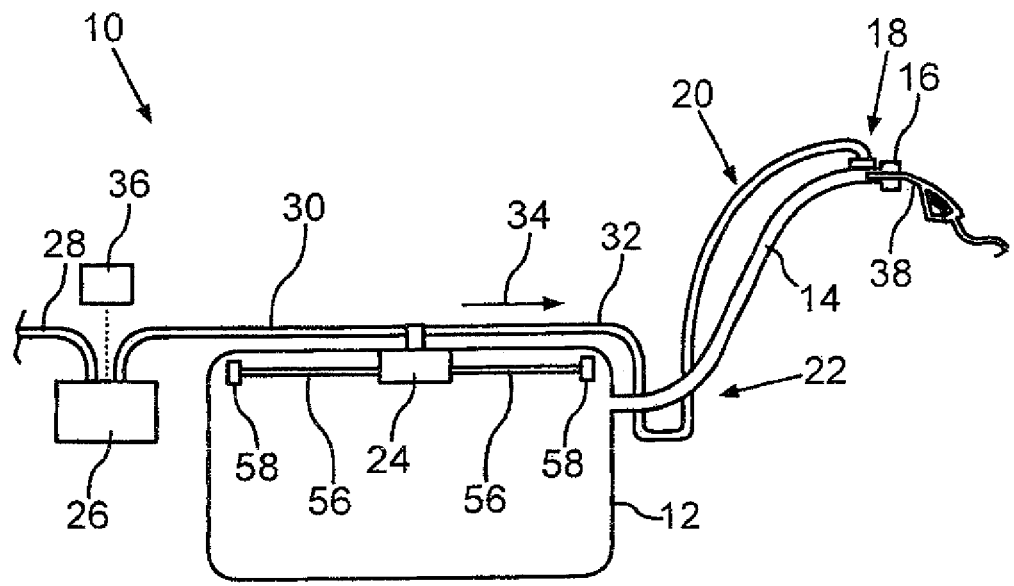
FIG. 1 a schematic representation of a tank ventilation device for a motor vehicle in which a ventilation line which leads from a filling tube of a fuel tank to an activated carbon filter ahs a siphon and FIG. 2 a connection of the ventilation line to the filling tube wherein a spherical float body is provided in a chamber of the connection, which prevents liquid fuel from entering the ventilation line.

A tank ventilation line 10 shown in FIG. 1 includes a fuel tank 12, which can be filled with fuel via a filling tube 14. Near the mouth 16 of the filling tube 14 a connection 18 is provided to which a ventilation line 20 is connected. The connection 18 is fixedly connected with the filling tube 14.

The ventilation line 20 has a siphon 22 because it is passed underneath a (not shown) component of the motor vehicle, for example a longitudinal member.

The ventilation line 20 is coupled with a (optional) liquid separator 24 of the fuel tank 12 and from there further leads to an activated carbon filter 26. The activated carbon filter 26 has an outlet 28 via which gaseous hydrocarbons, stored therein are conducted to a (not shown) internal combustion engine of the motor vehicle in order to regenerate the activated carbon filter 28.

The gaseous hydrocarbons, which are displaced out of the fuel tank during refueling, flow via a branch 30 of the ventilation line 20, which branch 30 leads to the activated carbon filter 26, to the activated carbon filter 26. Via a further branch 32 of the ventilation line 20, which branch 32 leads from the liquid separator 24 to the connection 18, gaseous hydrocarbons are re-circulated i.e., conducted back from the fuel tank 12 into the filling tube 14. This branch 32 has a siphon 22. A flow arrow 34, which indicates the direction of flow is shown for illustrating purposes in FIG. 1.

Beside the ventilation and recirculation during refueling, the ventilation line 20 also has a further function. Pressurizing the ventilation line 20 allows determining whether a leakage in the region of he filling tube 14 or of the fuel tank 12 exists. The tightness of the fuel tank 12 is determined via the branch 30 of the ventilation line 20.

An only schematically shown device 36 for carrying out the leakage test can correspondingly be configured to apply negative pressure to the ventilation line 20. When a vehicle user forgets to close the filing tube 14 with a (not shown) tank lid after pulling off the nozzle 38 from the mouth of the filling tube 14, this results in a decrease of the overpressure or the overpressure cannot be built up in the first place.

As an alternative, the device 36 for carrying out the leakage test can be configured to block the outlet 28 of the activated carbon filter 26 or the ventilation line 20 in the region of the connection to the activated carbon filter 26 so that a negative pressure builds up in the ventilation line 20 when the fuel tank 12 cools down. Also, a negative pressure can be generated actively for example by means of a pump of the device 36. Also in this case, the absence of the tank lid can be recognized when the negative pressure decreases too rapidly or is not built up in the first place.

In order to ensure this diagnosis function of the ventilation line 20, a spherical float body 40 (cf. FIG. 2) provided in the region of the connection 18 ensures that no liquid fuel reaches the siphon 22 where it may cause a hydraulic closure of the line. The connection 18 includes a chamber, which is open toward the filling tube 14, in which chamber 42 the float body 40 is located. A grid 44 ensures that the float body 44 cannot fall out of the chamber 42 and can reach the filling tube 14. A valve seat 48 for the float body 40 is formed by the outlet of the connection 18.

When the nozzle 38 is defective and does not shut down in spite of rising filling level in the filling tube 14, liquid fuel is able to enter the chamber 42 of the connection 18 from below. This is indicated by an arrow 50 in FIG. 2. This causes the float body 40 to float on the liquid fuel and to come into contact with the valve seat 48. As a result no liquid fuel can enter the ventilation line 20 and further into the siphon 22 through the socket 52 of the connection 18 to which the ventilation 20 line is connected.

Figure 2:
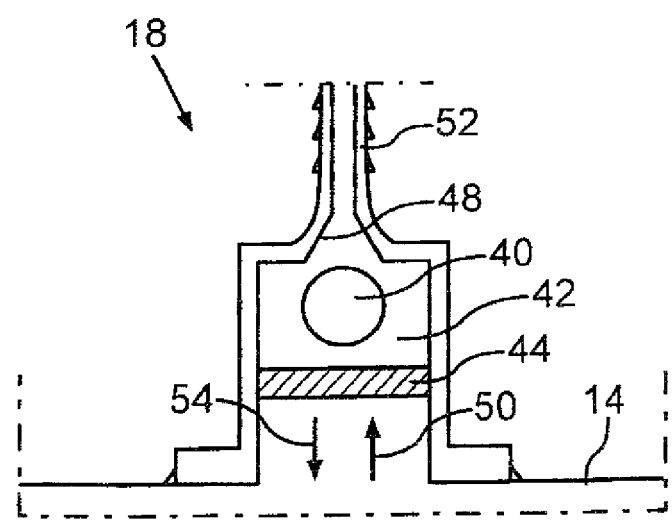

A further arrow 54 shown in FIG. 2 illustrates the flow direction of the re-circulated gaseous hydrocarbons during refueling which enter the filling tube 14 from the branch 32 of the ventilation line 20 in the region of the connection 18. The float body 40 is kept away from the valve seat 48 by the flow of the re-circulated gaseous hydrocarbons.

FIG. 1 further shows that the liquid separator 24 is connected with two operating ventilation valves 58 via respective connection lines 56, which operating ventilation lines 58 enable conducting gaseous hydrocarbons via the liquid separator 24 and subsequently the branch 30 of the ventilation line 20 toward the activated carbon filter 26, when the fuel tank 12 heats up.

In alternative embodiments, only one operating ventilation valve 58 or more than the present exemplary shown two operating ventilation valves 58 can be provided. Also a collection container 24 does not have to be provided. The tank ventilation in particular during operation can also occur in a different manner than the presently exemplary described manner wherein other valves than the presently schematically shown valves can be used.

What is claimed is:

1. A tank ventilation device for a motor vehicle, comprising:
    a ventilation line comprising a first branch and a second branch, wherein the first branch is connected via a connection to a filling tube for filling a tank of the motor vehicle and the second branch is connected to an accumulator for gaseous hydrocarbons, wherein the ventilation line is connected to the tank so that gaseous hydrocarbons which are displaced during refueling are re-circulated toward the connection into the filling tube via the ventilation line;
    a device for applying a pressure to the ventilation line for performing a leakage test of the tank ventilation device, when the filling tube is closed by a closure device;
    a float body provided in a chamber of the connection to the filing tube for preventing entering of liquid fuel into the ventilation line; and
    a retention element constructed as a grid arranged across a width of the chamber of the connection and located always entirely below the float body, said retention element preventing the float body from moving out of the chamber.

2. The tank ventilation device of claim 1, wherein the connection includes an outlet, said outlet forming a valve seat for the float body.

3. The tank ventilation device of claim 2, wherein the float body is constructed spherical.

4. The tank ventilation device of claim 1, wherein the ventilation line is coupled with a liquid separator arranged on the tank, said liquid separator being fluidly connected with at least one operating ventilation device of the tank.

5. The tank ventilation device of claim 1, wherein the ventilation line includes a U-shaped region configured for passage underneath at least one component of the motor vehicle.

\* \* \* \* \*